United States Patent [19]

Olenfalk et al.

[11] Patent Number: 4,570,983
[45] Date of Patent: Feb. 18, 1986

[54] PIPE CONNECTION WITH A SEAL RING SATISFYING HYGIENIC DEMANDS

[75] Inventors: Lars Olenfalk, Järfälla; Tor Delbou, Sollentuna, both of Sweden

[73] Assignee: Arla, Stockholm, Sweden

[21] Appl. No.: 475,681

[22] Filed: Mar. 15, 1983

[51] Int. Cl.³ ............................................. F16L 21/02
[52] U.S. Cl. .................................... 285/355; 285/212; 285/220; 285/363; 285/332.2; 285/368
[58] Field of Search ............... 285/355, 211, 212, 220, 285/363, 332.2, 368

[56] References Cited

U.S. PATENT DOCUMENTS

| 278,800 | 6/1883 | Kline | 285/355 X |
|---|---|---|---|
| 448,765 | 3/1891 | Kaiser | 285/363 X |
| 1,137,113 | 4/1915 | Bouchard | 285/332.2 X |
| 1,325,826 | 12/1919 | Baker et al. | 285/332.2 X |
| 1,368,196 | 2/1921 | Peck | |
| 1,878,195 | 9/1932 | Gisk | 285/363 X |
| 1,936,552 | 11/1933 | Goss | 285/120 |
| 2,070,291 | 2/1937 | McHugh | 285/368 X |
| 2,100,615 | 11/1937 | Snell | 285/148 |
| 2,487,241 | 11/1949 | Hilton | 285/157 |

FOREIGN PATENT DOCUMENTS 816253 8/1937 France .................... 285/368

Primary Examiner—Richard J. Scanlan, Jr.
Attorney, Agent, or Firm—Shapiro and Shapiro

[57] ABSTRACT

The invention relates to pipe connections satisfying hygienic demands, comprising two members which can be screwed together and a seal ring of plastically or elastically deformable material lying therebetween, and the object of the invention is to prevent the seal ring from being carried along and being displaced during tightening resulting in formation of nooks that might give rise to bacterial growth, cleaning problems and risks of contamination. According to the invention this object is achieved in that a first member has a first bore and a larger diameter second bore connected thereby by a Z-shaped transition, while a second member has an oblique end surface, a cross-sectionally triangular interspace being formed between the oblique end surface and a shoulder of the transition to receive the seal ring and to be filled out practically completely by the seal ring when the members are screwed together, and the seal ring may even protrude to some extent into the through hole.

12 Claims, 6 Drawing Figures

PIPE CONNECTION WITH A SEAL RING SATISFYING HYGIENIC DEMANDS

The invention relates to a pipe connection for satisfying hygienic demands, comprising two members which can be screwed together and a seal ring of plastically or elastically deformable material lying therebetween, preferably a so-called O-ring of synthetic rubber.

In the tightening of pipe connections comprising two members which can be screwed together and a seal ring lying therebetween the problem arises that the seal ring is apt to get displaced. A problem which is especially serious in the food industry is that displaced seals can give rise to nooks and deposits therein, which may cause cleaning problems and bacterial growth.

An object of the invention is to avoid the above-mentioned inconveniences, i.e. cleaning problems and formation of nooks in pipe connections of the type mentioned above.

These problems are solved by the invention which is characterized in that a first member has a first bore and a larger diameter second bore connected thereto by a Z-shaped transition or the like, while a second member of the pipe connection has an oblique end surface at the end thereof entering into said first member, a space being formed between the central stem of the Z-shaped transition and the oblique end surface in order to receive the seal ring and to be practically completely filled out by the seal ring when the sections are screwed together, and said ring may even protrude slightly into the through hole.

Further characteristics of the invention will appear hereinafter.

The invention will now be described briefly with reference to the accompanying drawings, in which.

Figure 1:
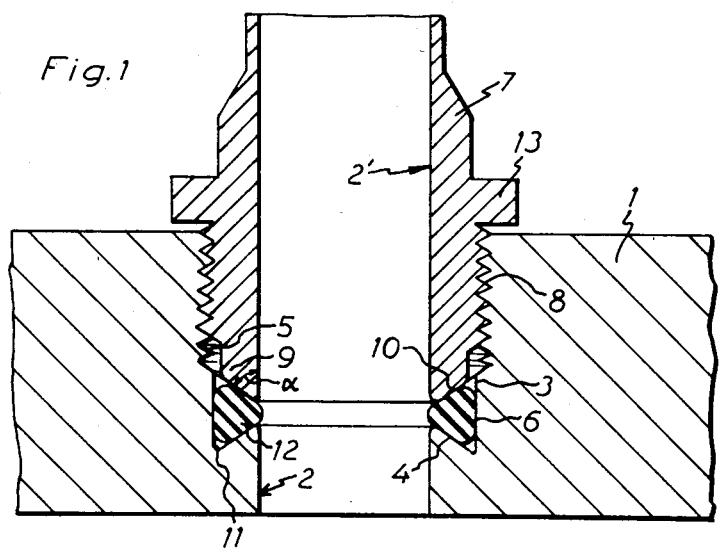
FIG. 1 shows an example of an embodiment of the invention as applied to the connection of a pipe piece to a container wall.

In the container wall or member designated by 1 in FIG. 1 there is first bored a through hole or bore 2 of a radius suitable for the intended purpose and then, coaxial therewith, a second hole or bore 3 of somewhat larger radius, (cross-section) extending from the connection side through about half the container wall 1. Between the hole 2 and the hole 3 there is thereupon fitted in a suitable manner a transition from the small to the large radius, having a Z-shaped cross-section. Finally there is fitted an internal thread 5 from the outside in a portion of the large hole, a cylindrical hole wall portion 6 being left adjacent the Z-transition 4.

To be screwed into this opening in the container wall a pipe member 7 according to the invention may be designed as follows in an embodiment in accordance with FIG. 1.

The pipe member 7 has the same free internal diameter as the first hole 2 described above and has at its end which is connectible with the container wall 1 an external thread 8 fitting the internal thread 5 mentioned above. The external thread 8 is turned off at its lower end so that there will be obtained in the end of the pipe member 7 a sleeve-like cylindrical end 9 the external diameter of which is almost equal to or slightly smaller than the diameter of the second hole 3 so that the sleeve end 9 can be accommodated in the hole 3. The end surface 10 of the sleeve end 9 is bevelled (inclined) with preferably the same angle α as the angle of inclination of the central stem of the Z-transition 4, though reversed. The angle between the central stem of the Z-transition 4 and the bevelled end surface 10 amounts preferably to 40° or more up to an upper limit of about 120°. The central stem forms a shoulder that extends outward from hole 2 and that is opposed to end surface 10 of the pipe member. The separation between the shoulder and the end surface of the pipe member increases outwardly.

In this way there is formed between the central stem of the Z-transition 4, the cylindrical portion 6 and the bevelled end surface 10 a free interspace 11 for insertion of a seal ring 12 which should consist of a fairly elastic material, e.g. synthetic rubber. A so-called O-ring can for instance be used to advantage. Such an O-ring has suitably a cross-sectional diameter standing in appropriate relation to the difference between the radii of the holes 2 and 3 and its external diameter is approximately equal to or slightly larger than the diameter of the large hole 3.

When the seal ring 12 has been placed in the hole 3 and the pipe member 7 is screwed into it the seal ring 12 is pushed by the oblique end surface 10 of the pipe member 7 against the central stem of the Z-shaped transition 4. During continued screwing the seal ring 12 is plastically deformed from its initially round to its more and more triangle-like cross-sectional shape and it finally seals very efficiently between said central stem and the oblique end surface 10. In this connection the seal ring may even protrude slightly into the through-flow passage formed by the hole 2 and the inner hole passage 2' of the pipe member 7.

On the pipe member 7 a stop flange 13 may suitably be provided to prevent the pipe member from being screwed too far into the container wall 1 so that the interfacing ends of the sealing surfaces 4 and 10 would come into contact with each other and risk being damaged.

Figure 2:
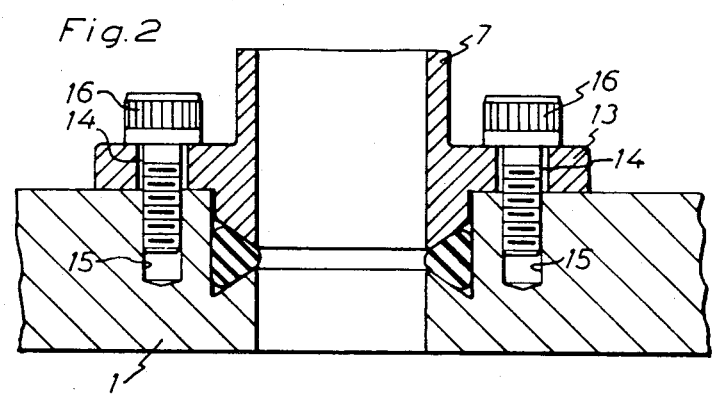
FIG. 2 shows a modification with a wider stop flange for screwing together by means of screws.

According to FIG. 2 the stop flange 13 may be made wider and be provided with through holes 14 at the same time as the container wall 1 is provided with threaded blind holes 15 for bolts 16 for screwing the members 7 and 1 together. In this case the internal thread 5 and the external thread 8 are dispensed with.

Figure 3:
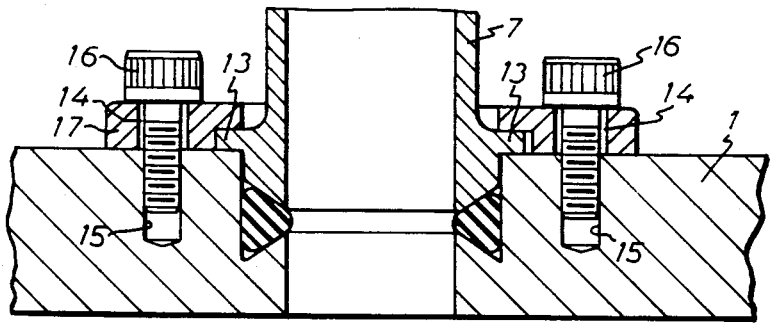
FIG. 3 shows a modification with an extra clamp ring and loose screws for screwing togther.
Figure 4:
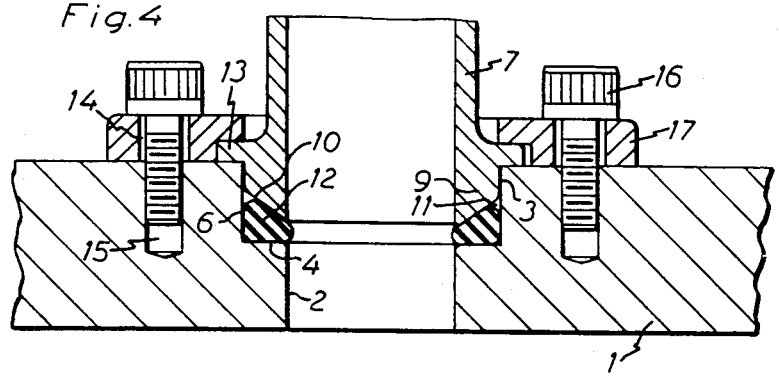
FIG. 4 shows an embodiment according to FIG. 3, including a Z-transition with an angle of about 90°.
Figure 5:
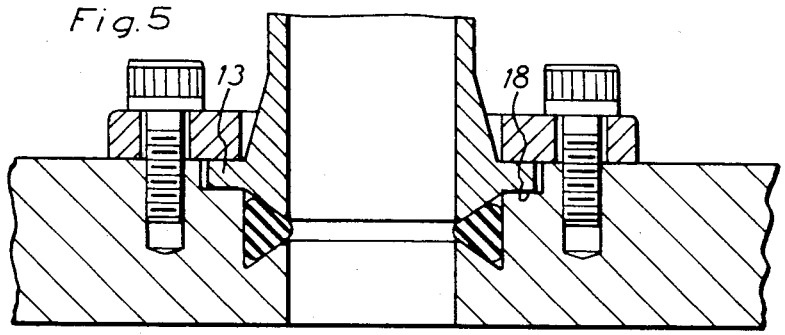
FIG. 5 shows an embodiment according to FIG. 3, in which the stop flange is countersunk in the container wall.

In the embodiment of FIG. 3 the stop flange 13 has the same width as in FIG. 1. Also in this case the internal and external threads 5, 8 are dispensed with. The screwing operation takes place instead by means of a loose flange ring 17 in the manner described in connection with FIG. 2. In the modification according to FIG. 4 the central stem of the Z-transition 4 is disposed at an angle of 90° relative to the longitudinal axis of the hole 2, which simplifies the manufacture. According to FIG. 5 the stop flange 13 has been countersunk in the container wall 1 in a groove 18.

Figure 6:
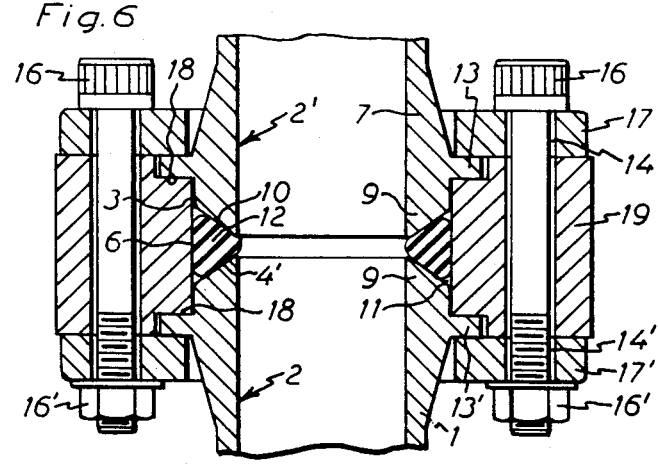
FIG. 6 shows a modification for the screwing together of two pipe ends.

FIG. 6 shows the application of the inventive concept to the screwing together of two pipe members 1 and 7 having each one flange 13, 13', screws 16 with nuts 16' and a socket-like intermediate ring piece 19 the inner side of which forms the cylindrical portion 6 of bore 3. The free interspace 11 for receiving the seal ring is formed between the downwardly directed, bevelled end surface 10 of the upper pipe member 7, the cylindrical portion 6 and the bevelled end surface 4' of the lower pipe member 1 (replacing the container wall 1 according to the other drawing figures), which end surface 4' herein corresponds to the central stem of the Z-transition.

As the space 11 is practically completely filled up by the compressed seal ring 12, when the pipe member 7 is screwed in, there are no nooks whatsoever where e.g. milk or other food deposits would adhere or give rise to bacterial growth or complicate cleaning with accompanying risks of contamination.

The configuration of the pipe member 7 in other respects, i.e. the portion of it lying above the container wall 1 as described in the examples of embodiment, is per se of less interest from the point of view of the present invention and can thus be chosen as desired or required.

The embodiment of the invention is not restricted to pipe members in container walls but is applicable also in other conjunctions, e.g. for connecting small pipes to large pipes with the pipe axes disposed at e.g. right angles to each other for fixing flange connections and it is on the whole applicable to various disconnectible connections within the food industry.

What we claim and desire to secure by Letters Patent is:

1. Apparatus for providing a hygienic fluid passage, comprising a pipe member with a bore therethrough and with a cylindrical end portion, another member having a cylindrical bore that extends from an opening in a surface of said other member to an interior region of said other member, said cylindrical end portion of said pipe member fitting into said cylindrical bore through said opening, said other member having another bore connected to said cylindrical bore at said region and of cross-section smaller than that of said cylindrical bore, means for fastening said pipe member to said other member with said cylindrical end porton in said cylindrical bore, said bores of said other member being connected at said region by a transition including a shoulder extending outward from said other bore and opposed to an end surface of said pipe member and separated therefrom by a space, at least one of said end surface and said shoulder being inclined at an angle such that the separation between said end surface and said shoulder increases outwardly, an elastically deformable O-ring seal disposed in said space compressed between said end surface and said shoulder and substantially filling said space, said O-ring seal being formed of a material having a circular cross-section in axial planes of the O-ring seal, said material being deformed into a substantially triangular cross-section when said O-ring seal is compressed between said end surface and said shoulder, and means separate from said O-ring seal for limiting the insertion of said cylindrical end portion of said pipe member into said cylindrical bore to a position at which contact between said end surface and said shoulder is prevented, whereby the dimensions of said space between said end surface and said shoulder and the configuration of the compressed elastically deformable O-ring seal are predetermined to provide a continuous fluid passage comprising the bore of said pipe member, said other bore, and a portion of said O-ring seal.

2. Apparatus in accordance with claim 1, wherein said end surface and said shoulder are reversely inclined.

3. Apparatus in accordance with claim 1, wherein said shoulder is substantially radial to said other bore.

4. Apparatus in accordance with claim 1, wherein said means for fastening said pipe member to said other member comprises external threads on said pipe member and internal threads in said one bore.

5. Apparatus in accordance with claim 1, wherein said means for fastening said pipe member to said other member comprises a flange on said pipe member and means for fastening said flange to said other member.

6. Apparatus in accordance with claim 1, wherein said other member comprises a further pipe member and a ring surrounding adjacent ends of said pipe members, said shoulder being constituted by an end surface of said further pipe member.

7. Apparatus in accordance with claim 1, wherein the angle between said end surface and said shoulder is from about 40° to about 120°.

8. Apparatus in accordance with claim 1, wherein said limiting means comprises a flange on said pipe member that engages a stop surface on said other member.

9. Apparatus in accordance with claim 8, wherein said fastening means comprising screws threaded into said other member and having means for holding said flange against said stop surface.

10. Apparatus in accordance with claim 9, wherein the last-mentioned means comprises a ring that clamps said flange against said stop surface when said screws are threaded into said other member.

11. Apparatus in accordance with claim 1, wherein the compressed seal O-ring seal has an outer diameter substantially equal to the diameter of said cylindrical bore and has an inner diameter substantially equal to the diameters of the bore of said pipe member and said other bore.

12. Apparatus in accordance with claim 11, wherein the material said O-ring seal is synthetic rubber.

* * * * *